United States Patent
Schornack

(10) Patent No.: US 10,970,187 B2
(45) Date of Patent: Apr. 6, 2021

(54) SYSTEM AND METHOD FOR PROACTIVELY HEALING A MAINFRAME COMPUTER SYSTEM

(71) Applicant: JPMorgan Chase Bank, N.A., New York, NY (US)

(72) Inventor: Laura Schornack, Oak Park, IL (US)

(73) Assignee: JPMORGAN CHASE BANK, N.A., New York, NY (US)

( * ) Notice: Subject to any disclaimer, the term of this patent is extended or adjusted under 35 U.S.C. 154(b) by 0 days.

(21) Appl. No.: 16/668,587

(22) Filed: Oct. 30, 2019

(65) Prior Publication Data

US 2020/0133817 A1 Apr. 30, 2020

Related U.S. Application Data

(60) Provisional application No. 62/753,285, filed on Oct. 31, 2018.

(51) Int. Cl.
*G06F 11/34* (2006.01)
*G06F 9/54* (2006.01)
*G06N 20/00* (2019.01)

(52) U.S. Cl.
CPC .......... *G06F 11/3419* (2013.01); *G06F 9/546* (2013.01); *G06F 11/3447* (2013.01); *G06F 11/3476* (2013.01); *G06N 20/00* (2019.01)

(58) Field of Classification Search
CPC ............. G06F 11/3419; G06F 11/3447; G06F 11/3476; G06F 9/546; G06N 20/00
USPC ........................................................ 709/224
See application file for complete search history.

(56) References Cited

U.S. PATENT DOCUMENTS

| | | | |
|---|---|---|---|
| 2018/0089259 A1* | 3/2018 | James | G06F 16/2282 |
| 2018/0165336 A1* | 6/2018 | Venkateswarulu | G06F 16/2246 |
| 2018/0211182 A1* | 7/2018 | Lei | G06K 9/6232 |
| 2019/0065992 A1* | 2/2019 | Eck | G06Q 10/08 |
| 2019/0147085 A1* | 5/2019 | Pal | G06F 16/24542 707/718 |
| 2019/0205736 A1* | 7/2019 | Bleiweiss | G06N 3/08 |
| 2020/0125044 A1* | 4/2020 | Ide | G06Q 10/20 |

FOREIGN PATENT DOCUMENTS

JP 6136567 B2 * 5/2017

* cited by examiner

*Primary Examiner* — Umar Cheema
*Assistant Examiner* — John Fan
(74) *Attorney, Agent, or Firm* — Greenblum & Bernstein, P.L.C.

(57) ABSTRACT

A system and method for generating a data set structured for recognition of time series data by a machine learning computer are provided. The method includes acquiring time series data, generating tensor units based on the time series data, and identifying a target tensor unit including a time of failure of a mainframe computer system. The method further includes generating tensor sets, in which at least one tensor set includes the target tensor unit. The generated tensor sets are then migrated to a machine learning computer for generating or updating of a computer model based on the time series data, the computer model recognizing a data pattern preceding the time of failure of the mainframe computer system. The computer model is then applied to data in a production environment for identifying a production data pattern corresponding to a data pattern recognized in the tensor sets.

16 Claims, 9 Drawing Sheets

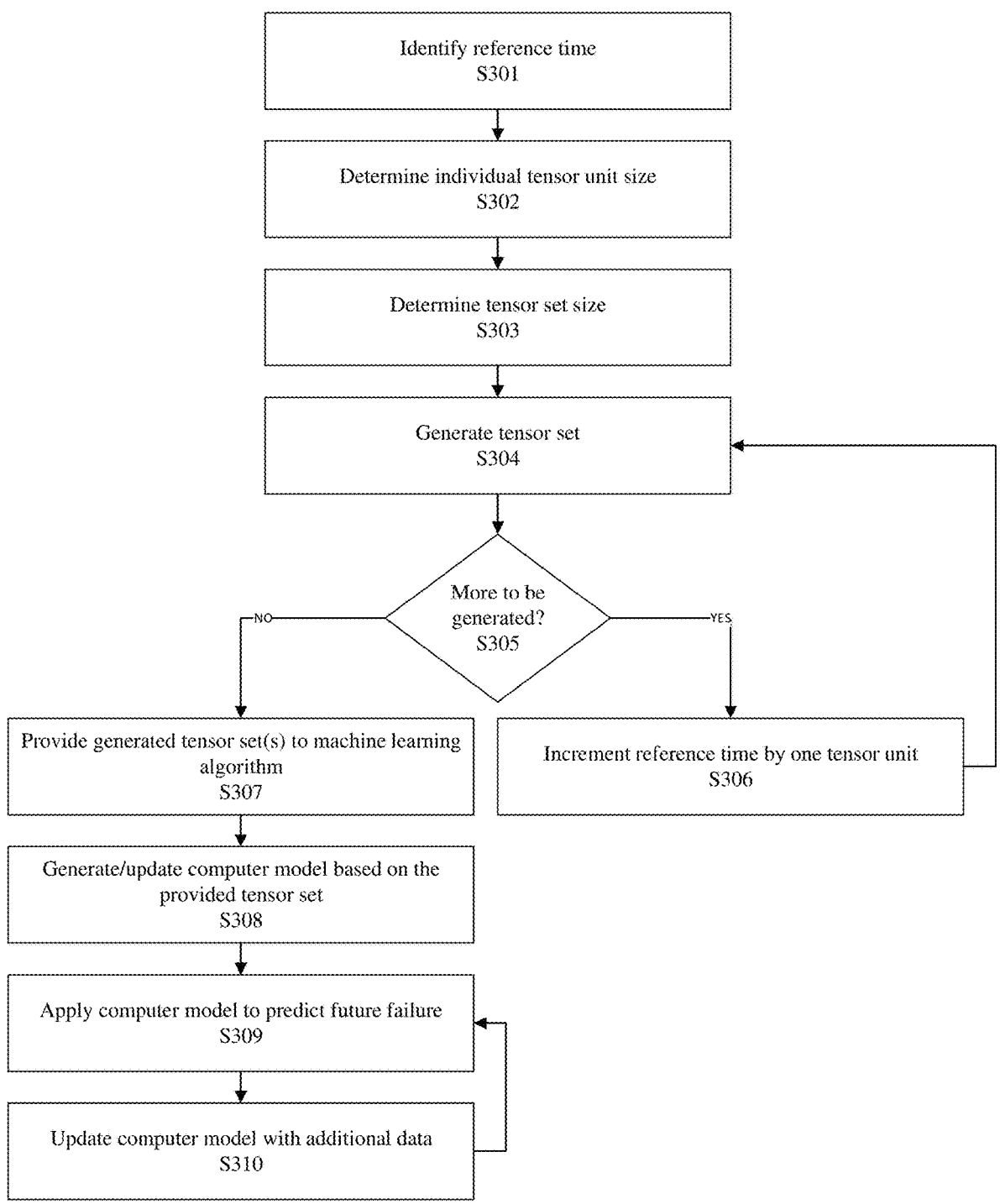

SYSTEM AND METHOD FOR PROACTIVELY HEALING A MAINFRAME COMPUTER SYSTEM

BACKGROUND

1. Field of the Disclosure

The present disclosure relates to the field of monitoring of failures of a mainframe computer system and providing of the monitored failure to a computer having a machine learning algorithm. More particularly, the present disclosure relates to structuring raw data to have a particular data structure to teach the computer having the machine learning algorithm to learn time aspects of the monitored data, for proactively detecting symptoms leading to the failure of the mainframe computer system prior to the failure.

2. Background Information

Conventionally, a failure of a mainframe computer system is detected after an actual failure of the mainframe computer system. As such failures are unexpected, delayed response times and/or excessive down times may be incurred. Data collection provided for the mainframe computer system may indicate a particular time of failure.

Based on identified times of such failures, operation times between detected failures may be roughly calculated. However, such rough estimates may provide for unnecessary servicing where none may be required, which may unnecessarily disrupt normal operations of the mainframe computer system. Further, the rough estimate to next failure do not accurately predict when the mainframe computer system will actually fail, as such failure is typically not caused by routine wear on hardware of the mainframe computer system. Accordingly, such rough estimates fail to prevent against excessive down times caused by such failures, and may potentially cause greater inefficiencies. Accordingly, conventional monitoring of failure data does not effectively prevent failures of the mainframe computer system, which may lead to extended down times.

BRIEF DESCRIPTION OF THE DRAWINGS

FIG. 3 shows an exemplary method for generating fixed sized data structures for generating or updating of a computer model by a machine learning algorithm, according to an aspect of the present disclosure;

DETAILED DESCRIPTION

In view of the foregoing, the present disclosure, through one or more of its various aspects, embodiments and/or specific features or sub-components, is thus intended to bring out one or more of the advantages as specifically noted below.

Methods described herein are illustrative examples, and as such are not intended to require or imply that any particular process of any embodiment be performed in the order presented. Words such as "thereafter," "then," "next," etc. are not intended to limit the order of the processes, and these words are instead used to guide the reader through the description of the methods. Further, any reference to claim elements in the singular, for example, using the articles "a," "an" or "the", is not to be construed as limiting the element to the singular.

Figure 1:
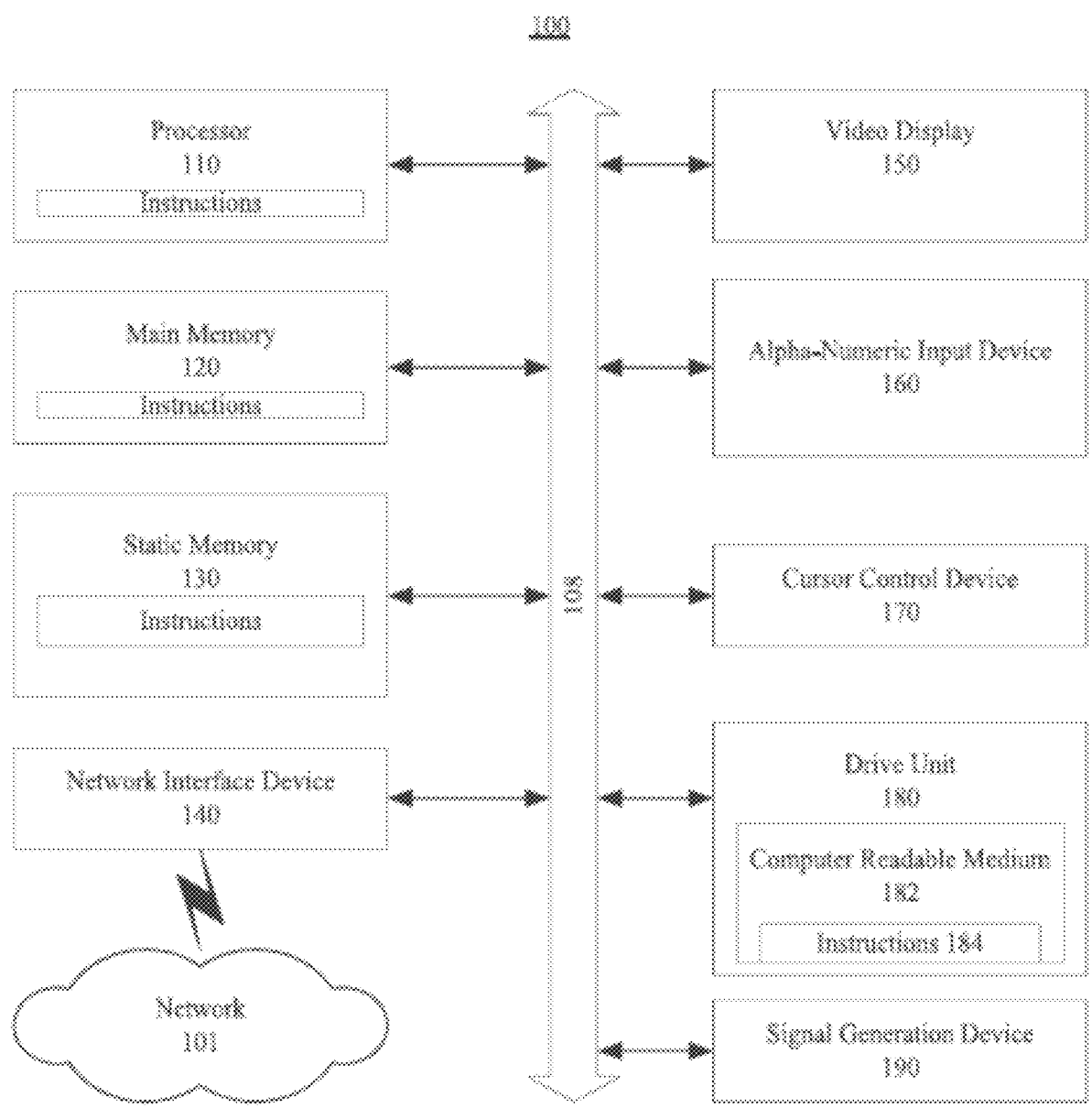
FIG. 1 shows an exemplary general computer system that includes a set of instructions for providing a modified data structure in a machine learning environment to process the modified data structure in a time series manner.

FIG. 1 is an illustrative embodiment of a general computer system, on which a method of providing a modified data structure in a machine learning environment to process the modified data structure in a time series manner can be implemented, and which is shown and is designated 100. The computer system 100 can include a set of instructions that can be executed to cause the computer system 100 to perform any one or more of the methods or computer based functions disclosed herein. The computer system 100 may operate as a standalone device or may be connected, for example, using a network 101, to other computer systems or peripheral devices. Further, the computer system 100 may connect or communicate with other computer systems by near field communications, which includes, without limitation, near field communication (NFC), Bluetooth, radio frequency identification (RFID), or other communication technologies that allow direct communication with another computer system or device.

In a networked deployment, the computer system 100 may operate in the capacity of a server, a client user computer, or any computing device having at least a processor and a memory in a server-client user network environment, or as a peer computer system in a peer-to-peer (or distributed) network environment. The computer system 100 may operate in a network environment including an intermediary device for facilitating transactions with other computer systems, or in a peer-to-peer network environment without the intermediary device. The intermediary device may be a remote third party server residing on a network or a third party device that is not directly involved in a transaction between two computer systems or devices.

The computer system 100 can also be implemented as or incorporated into various devices, such as a stationary computing device, a mobile computer, a wearable computer (e.g., smart watch), a computer system in a vehicle, a personal computer (PC), a laptop computer, a tablet computer, a wireless smart phone, a personal digital assistant (PDA), a communications device, a control system, a network router, switch or bridge, or any other machine capable of executing a set of instructions (sequential or otherwise) that specify actions to be taken by that machine. The computer system 100 can be incorporated as or in a particular device that in turn is in an integrated system that includes additional devices. In a particular embodiment, the computer system 100 can be implemented using electronic devices that provide voice, video or data communication. Further, while a single computer system 100 is illustrated, the term "system" shall also be taken to include any collection of systems or sub-systems that individually or jointly execute a set, or multiple sets, of instructions to perform one or more computer functions.

As illustrated in FIG. 1, the computer system 100 includes a processor 110. A processor for a computer system 100 is tangible and non-transitory. As used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. A processor is an article of manufacture and/or a machine component. A processor for a computer system 100 is configured to execute software instructions in order to perform functions as described in the various embodiments herein. A processor for a computer system 100 may be a general purpose processor or may be part of an application specific integrated circuit (ASIC). A processor for a computer system 100 may also be a microprocessor, a microcomputer, a processor chip, a controller, a microcontroller, a digital signal processor (DSP), a state machine, or a programmable logic device. A processor for a computer system 100 may also be a logical circuit, including a programmable gate array (PGA) such as a field programmable gate array (FPGA), or another type of circuit that includes discrete gate and/or transistor logic. A processor for a computer system 100 may be a central processing unit (CPU), a graphics processing unit (GPU), or both. Additionally, any processor described herein may include multiple processors, parallel processors, or both. Multiple processors may be included in, or coupled to, a single device or multiple devices.

Moreover, the computer system 100 includes a main memory 120 and a static memory 130 that can communicate with each other via a bus 108. Further, the computer system 100 may access external memory via a network, such as a cloud network.

Memories described herein are tangible storage mediums that can store data and executable instructions, and are non-transitory during the time instructions are stored therein. As used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. A memory described herein is an article of manufacture and/or machine component. Memories described herein are computer-readable mediums from which data and executable instructions can be read by a computer. Memories as described herein may be random access memory (RAM), read only memory (ROM), flash memory (e.g., secure digital (SD) non-volatile memory card), electrically programmable read only memory (EPROM), electrically erasable programmable read-only memory (EEPROM), registers, a hard disk, a removable disk, tape, compact disk read only memory (CD-ROM), digital versatile disk (DVD), floppy disk, Blu-ray disk, or any other form of storage medium known in the art. Memories may be volatile or non-volatile, secure and/or encrypted, unsecure and/or unencrypted.

As shown, the computer system 100 may further include (or may be connected to) a video display unit 150, such as a liquid crystal display (LCD), an organic light emitting diode (OLED), a flat panel display, a solid state display, or a cathode ray tube (CRT). Additionally, the computer system 100 may include an alpha-numeric input device 160, such as a keyboard/virtual keyboard or touch-sensitive input screen or speech input with speech recognition, and a cursor control device 170, such as a mouse or touch-sensitive input screen or pad. Further, the alpha-numeric input device 160 may additionally include a biometric input device, which may capture biometric information of a user. The biometric input device may include, without limitation, a finger print reader, a camera, an iris scanner, a microphone, and any other device that may capture biometric information of the user. The computer system 100 can also include a drive unit 180, a signal generation device 190, such as a speaker or remote control, and a network interface device 140.

In a particular embodiment, as depicted in FIG. 1, the drive unit 180 may include a computer-readable medium 182 in which one or more sets of instructions 184, e.g. software, can be embedded. Sets of instructions 184 can be read from the computer-readable medium 182. Further, the instructions 184, when executed by a processor, can be used to perform one or more of the methods and processes as described herein. In a particular embodiment, the instructions 184 may reside completely, or at least partially, within the main memory 120, the secondary memory 130, and/or within the processor 110 during execution by the computer system 100.

In an alternative embodiment, dedicated hardware implementations, such as application-specific integrated circuits (ASICs), programmable logic arrays and other hardware components, can be constructed to implement one or more of the methods described herein. One or more embodiments described herein may implement functions using two or more specific interconnected hardware modules or devices with related control and data signals that can be communicated between and through the modules. Accordingly, the present disclosure encompasses software, firmware, and hardware implementations. Nothing in the present application should be interpreted as being implemented or implementable solely with software and not hardware such as a tangible non-transitory processor and/or memory.

In accordance with various embodiments of the present disclosure, the methods described herein may be implemented using a hardware computer system that executes software programs. Further, in an exemplary, non-limited embodiment, implementations can include distributed processing, component/object distributed processing, and parallel processing. Virtual computer system processing can be constructed to implement one or more of the methods or functionality as described herein, and a processor described herein may be used to support a virtual processing environment.

The present disclosure contemplates a computer-readable medium 182 that includes instructions 184 or receives and executes instructions 184 responsive to a propagated signal; so that a device connected to a network 101 can communicate voice, video or data over the network 101. Further, the instructions 184 may be transmitted or received over the network 101 via the network interface device 140.

Figure 2A:
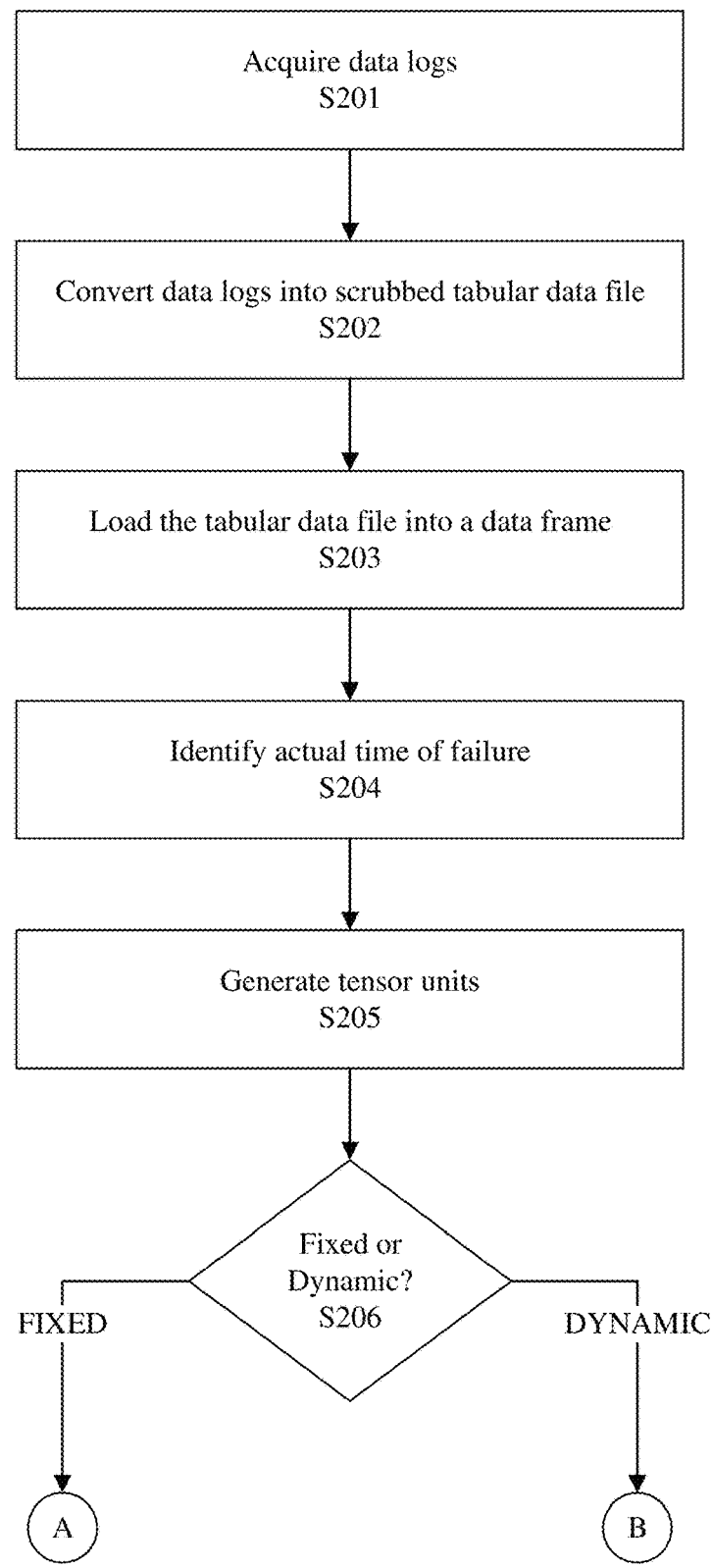
FIGS. 2A-2B show an exemplary method for providing a modified data structure to a machine learning environment in a time series manner for teaching a computer having a machine learning algorithm to identify data patterns prior to failure, according to an aspect of the present disclosure.
Figure 2B:
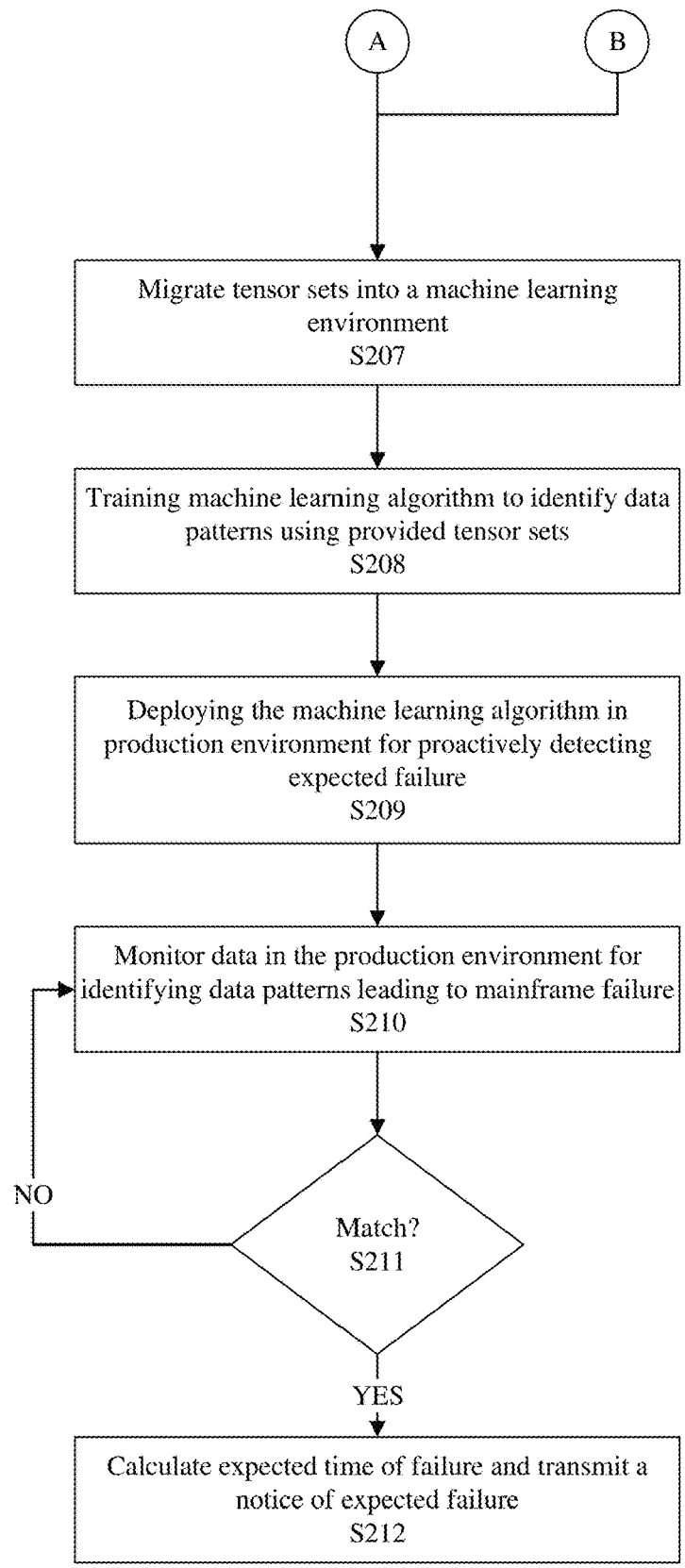

FIGS. 2A-2B show an exemplary method for providing a modified data structure to a machine learning environment in a time series manner for teaching a computer having a machine learning algorithm to identify data patterns prior to failure, according to an aspect of the present disclosure.

Machine learning (ML) may refer to a study of algorithms and statistical models that a computer system may utilize for automatically performing a task, without receiving manual instructions from an operator. In an example, machine learning algorithms may build or modify a computer model based on sample or training data. The computer model may then be utilized to make predictions or decisions, such as predicting a machine failure. According to aspects of the present disclosure, a supervised learning algorithm may build or modify a computer model for a set of data that contains both inputs and desired outputs. Such data set may be referred to as training data.

However, machine learning algorithms have difficulty building a computer model based on time series data. In other words, there is no effective computer model for determining how many hours in the future a system, such as a mainframe computer system, will fail. In view of the above noted deficiencies of conventional machine learning algorithms, learning or training data has to be specifically configured or structured to be fed into a machine learning algorithm for building a computer model for recognizing patterns and predicting future machine failures based on the recognized patterns. According to aspects of the present disclosure, dynamic rolling tensor data sets may be provided to a machine learning algorithm to allow a machine to recognize patterns in the time series data.

In operation S201, message queue (MQ) data logs that are created in the mainframe computer system are acquired as a tabular data log, such as a comma-separated value (CSV) log. The MQ data logs may include columns of data, and may indicate a particular queue size at a given time. In an example, the CSV log is a result of logging health of the MQ on the data every minute. However, aspects of the present disclosure are not limited thereto, such that data on the health of the MQ may be captured at other units of time.

In operation S202, the CSV log is processed to be converted into a new CSV file. The processing of the CSV log includes at least one of loading, editing, viewing and outputting scrubbed data into the CSV file.

In operation S203, the converted CSV file is loaded into a data frame, such as a Python Pandas data frame.

In operation S204, a discrete time of a detected failure in the mainframe computer system is identified.

In operation S205, multiple tensor units are generated in view of the identified failure using the CSV file for a predetermined duration. For example, one tensor unit may be generated for each hour of data included in the CSV file, and sequentially arranged with respect to time to create a time series data as a tensor set. Some of the generated tensor units may include a time of failure of the mainframe computer system. The generated tensor units may be arranged in a sequential manner to provide for time series data, and the sequentially arranged tensor units may also be grouped as a particularly sized set, hereinafter referred to as a tensor set. In an example, the generated tensor units may be held using Pandas data structure.

In operation S206, a determination as to whether to group the tensor units in a fixed sized set or a dynamically sized set is made. For example, the tensor units may be grouped to be of a fixed size of a particular duration, such as four hours including four tensor units of one hour increments. The fixed size may be set regardless of whether each of the fixed duration sets include a detected failure of the mainframe computer system or not.

Also, the tensor units may be sub-grouped in different sizes in view of a detected failure of the mainframe computer system. For example, when a failure is detected at 11 PM, multiple sub-tensor sets of varying sizes may be provided to include varying duration preceding the failure time point. More specifically, sub-tensor sets including anywhere between one to twenty four hours of tensor units preceding the time of failure may be provided. The varying sized sub-tensor sets may be provided to a computer having a machine learning algorithm, such as a Neural Network to identify patterns of data leading to the failure point of the mainframe computer system.

In an example, multiples of sub-tensor sets with a common tensor unit, which may include a common time of failure of a mainframe computer system, may be grouped as a tensor set. However, aspects of the present disclosure are not limited thereto, such that the common tensor unit many be an arbitrary point in time. For example, sub-tensor sets of varying sizes starting with 1 PM tensor unit may be grouped as a single tensor set.

Figure 5A:
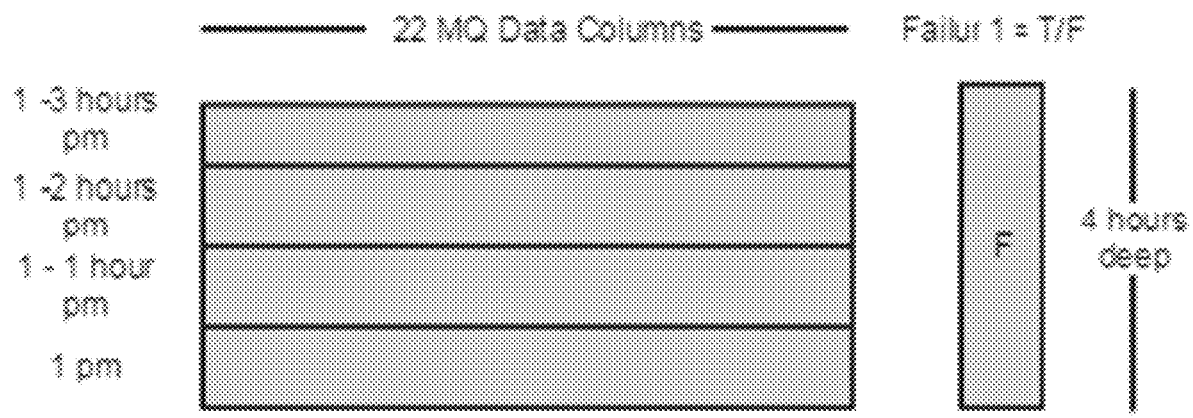
FIGS. 5A-5B show exemplary fixed size tensor sets corresponding to an operation of a mainframe computer system, according to an aspect of the present disclosure.

Referring to FIG. 5A, a fixed size tensor set corresponding to a normal operation of a mainframe computer system is illustrated according to an aspect of the present disclosure. In FIG. 5A, a fixed size tensor set of four hours may start at 10 AM, at which the mainframe computer system may be determined to be operating at a normal state, may include sequential tensor units in one hour increments that end at 2 PM (last tensor unit in the tensor set starting at 1 PM and ending at 2 PM). Tensor sets of a fixed size may be helpful if the failure occurs within four hours from the start point. For example, if the failure is determined to occur within the four hour period, for example, at 12 PM, a warning may be generated for engineers to service the mainframe computer system prior to failing to avoid extended downtimes and unexpected outages. If the failure does not occur within the fixed sized tensor set, a column field indicating failure of the mainframe computer system may include a value of False.

Figure 5B:
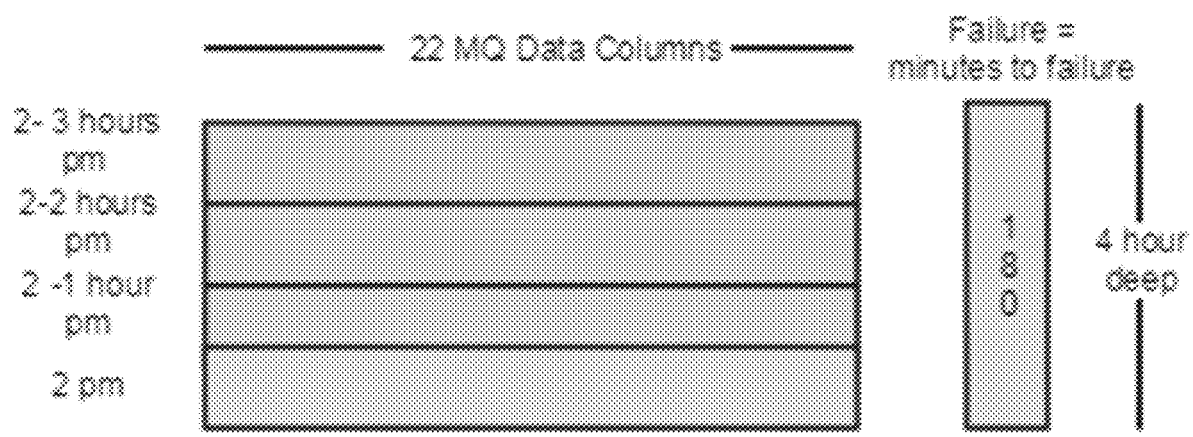

Referring to FIG. 5B, a fixed size tensor set including a detected failure in the mainframe computer system is illustrated according to an aspect of the present disclosure. In FIG. 5B, the fixed size tensor set of four hours may start at 11 AM, at which the mainframe computer system may be determined to be operating at a normal state, and include sequential tensor units in one hour increments ending at 3 PM (last tensor unit in the tensor set starting at 2 PM and ending at 3 PM). In the tensor unit including time series data from 2 PM to 3 PM, a failure of the mainframe computer system may be detected. For example, the failure may be detected at 2 PM. In this instance, a value of the column field indicating the detected failure may be modified to indicate a True value and/or expected time until failure may be provided. As illustrated in FIG. 5B, 180 minutes until failure is indicated for the respective fixed tensor set. Further, although not illustrated, when appropriate, a type of failure detected may also be added. Tensors sets indicated as including a tensor unit with the detected failure, or a target tensor unit, may be provided to the computer having the machine learning algorithm for analysis. Other tensor sets not including the tensor unit with the detected failure may or may not be provided to the computer having the machine learning algorithm.

Figure 6A:
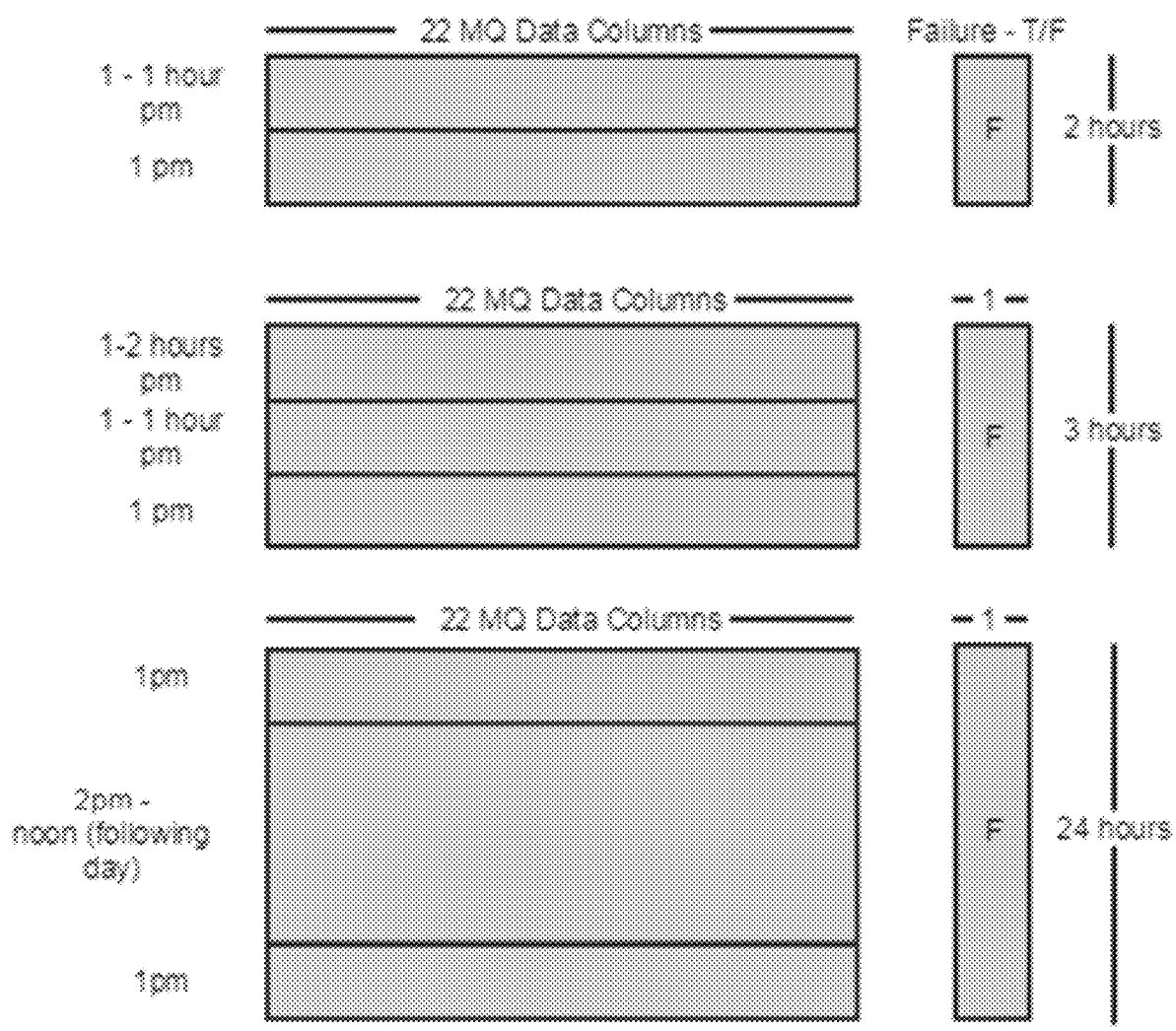
FIGS. 6A-6B show exemplary dynamic size tensor sets corresponding to an operation of a mainframe computer system, according to an aspect of the present disclosure.

Referring to FIG. 6A, varying dynamically sized sub-tensor sets are illustrated according to an aspect of the present disclosure. In an example, when a failure in the mainframe computer system has been detected at 2 PM, varying sets of dynamically sized sub tensor sets may be generated with respect to 2 PM as a reference time point or tensor unit. In an example, the reference time point or tensor unit may be a starting point or an end point of a tensor set or sub-tensor set. The dynamically sized sub-tensor sets may include a two hour sub-tensor set to illustrate a state of data one hour prior to the detected failure, a three hour sub-tensor set to illustrate a state of data two hours prior to the detected failure, a four hour sub-tensor set to illustrate a state of data three hours prior to the detected failure and so on. A dynamically sized sub-tensor set may go up to a twenty four hour sub-tensor set to illustrate a state of data twenty three hours prior to failure. By providing varying sized sub-tensor sets, a machine learning algorithm may be able to detect a particular pattern of data prior to failure for predicting future failures by the mainframe computer system. Although a dynamically sized tensor set up to twenty four hours has been illustrated, aspects of the present disclosure are not limited thereto, such that other sizes may be implemented. Further, as illustrated in FIG. 6A, if the failure does not occur within the dynamically sized tensor set, a column field indicating failure of the mainframe computer system may include a value of False.

Figure 6B:
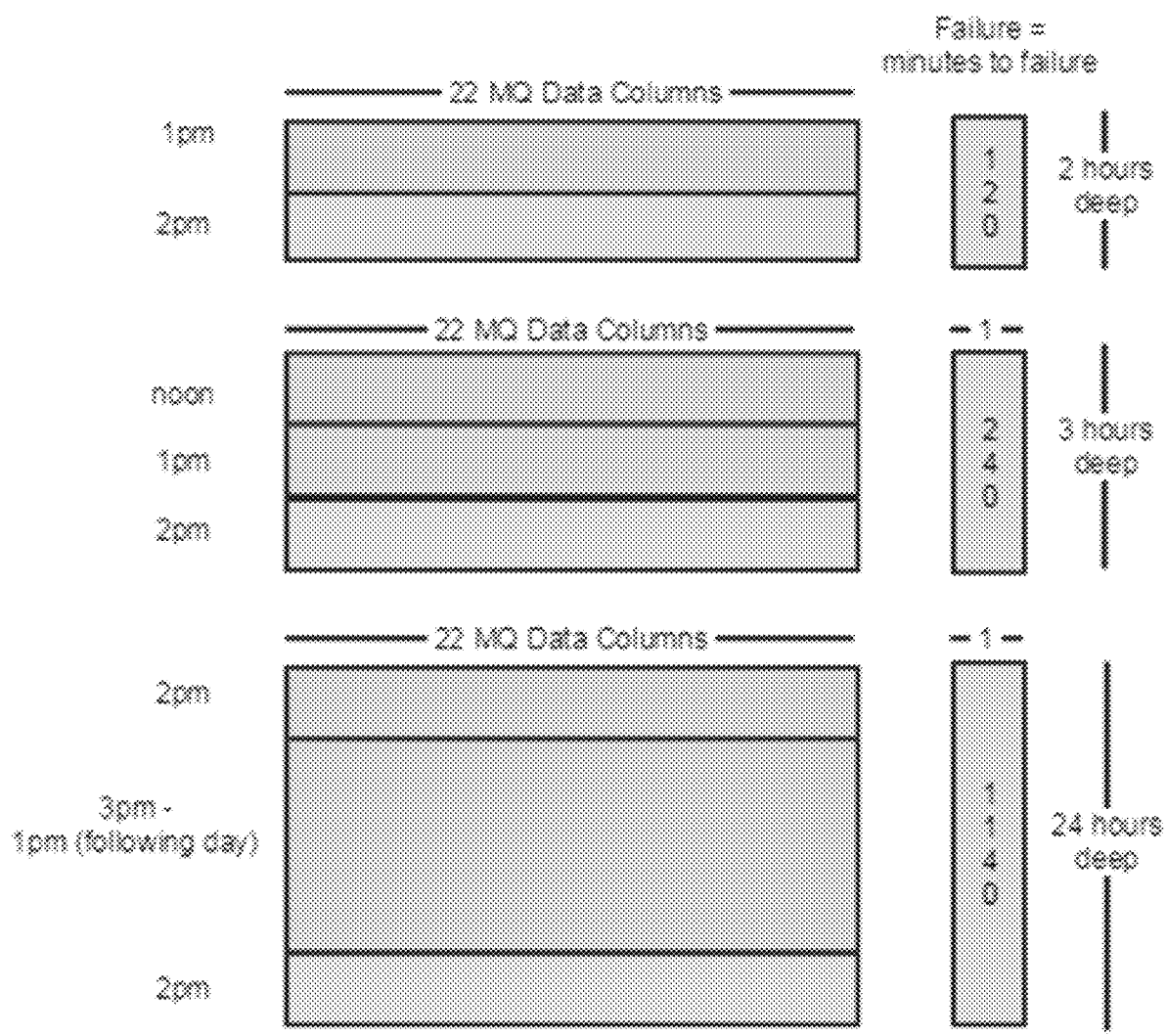

Referring to FIG. 6B, for each of the tensor units included in the dynamically sized sub-tensor sets, a value of the column field indicating the detected failure may be modified to indicate a True value and/or expected time until failure may be provided. As illustrated in FIG. 6B, 120, 240, and 1140 minutes until failure are indicated for the respective dynamically sized sub-tensor sets. Further, although not illustrated, when appropriate, a type of failure detected may also be added. Tensors sets indicated as including a tensor unit with the detected failure, or a target tensor unit, may be provided to the computer having the machine learning algorithm for analysis. Other sub-tensor sets not including the tensor unit with the detected failure may or may not be provided to the computer having the machine learning algorithm.

In operation S207, the tensor sets are migrated into a test machine learning environment for having a machine learning computer system to analyze the provided tensor sets with respect to time, and to generate or update a computer model for recognizing patterns in the provided time series data presented as tensor sets.

In operation S208, the machine learning computer system is trained to identify a pattern of data leading to the detected failure by sequentially processing the tensor units in a time series manner. For example, when dynamically sized tensor sets are provided, machine learning may analyze a data pattern or trend an hour before the detected failure, two hours before the detected failure, three hours before the detected failure and so on. Similarly, when fixed size tensor sets are provided, machine learning may be performed to identify tensor sets having the failure time point, and analyze data patterns of the respective tensor sets to identify a pattern of data preceding the failure time point. In an example, patterns of data may be unique to a specific failure type.

In operation S209, the trained machine learning algorithm is migrated to a production environment to proactively detect for expected failures by searching for data patterns in the production environment matching the observed data pattern with the data patterns identified in the test environment.

In operation S210, data in the production environment is monitored for identifying data patterns leading to the failure in the mainframe computer system.

In operation S211, a determination of whether the monitored data in the production environment matches with the identified data patterns is made. If no match exists, the method proceeds to operation S210. If the observed data matches with the identified data patterns, then the method proceeds to operation S212. In operation S212, a calculation of expected time of failure is determined and a notice of expected failure is provided. In an example, in the notice, expected time until the expected time of failure, a type of failure and required actions may be provided for reducing/minimizing disruption to the operations of the mainframe computer system and its related systems. Accordingly, extended down times and severity of down times may be alleviated by proactively servicing the mainframe computer system prior to the expected time of failure.

FIG. 3 shows an exemplary method for generating fixed sized data structures for generating or updating of a computer model by a machine learning algorithm, according to an aspect of the present disclosure.

In operation S301, a reference time for building a tensor set is identified. The reference time may be an arbitrary point in time, or may be within a certain time range of a known failure time. For example, the reference time may be a start time of a tensor set, such that if the tensor set is to include 4 hours of data, the start time may be set to 10 AM which may extend 4 hours deep to end at 1 PM. Alternatively, the reference time may refer to an end time of a tensor set, such that if the tensor set is to include 4 hours of data, the end time may be set to 1 PM, and may include tensor units starting 4 hours prior to the 1 PM. Further still, aspects of the present application are not limited thereto, such that the reference time may refer to a start time of one of a tensor unit included in the tensor set. For example, as exemplarily illustrated in FIG. 5A, the start time may start at 1 PM, which is a start time of the last tensor unit included in the tensor set.

In operation S302, individual tensor size is determined. For example, each tensor unit may be set to include one hour of data. However, aspects of the present disclosure are not limited thereto, such that each tensor unit may include different duration of data.

In operation S303, a tensor set size is determined. In an example, the tensor set may include one or more tensor units. Further, the tensor set may be of a fixed size or may have one or more variable sized sets. More specifically, as illustrated in FIGS. 5A-5B, each tensor set may be fixedly sized (e.g., four hours in duration) with respect to the reference time identified in operation S301.

In operation S304, a tensor set is generated based on the attributes determined or specified in operations S301-S304. In an example, a tensor set may be generated by acquiring of data logs, converting the acquired data logs into a scrubbed tabular data file, and loading the tabular data file into a data frame.

In operation S305, a determination of whether more tensor sets need to be generated is performed. For example, the determination of operation S305 may be based on a number of tensor sets generated and comparing that number against a set reference value. For example, at least since the tensor sets are structured to teach a machine learning algorithm to recognize a time series data, the number of tensor sets to be generated may be larger than one.

If additional tensor sets are determined to be required in operation S305, the reference time identified in operation S301 is incremented by one tensor unit and another tensor set is generated in operation S304. More specifically, if the reference time identified in operation S301 was 1 PM, then the incremented reference time in operation S306 may be 2 PM. Although incrementation of one tensor unit is disclosed in operation S306, aspects of the present disclosure are not limited thereto, such that the reference time may be incremented by a different duration or different number of tensor units.

If it is determined that no additional tensor sets are required in operation S305, the generated tensor sets are then provided to the machine learning algorithm in operation S307.

In operation S308, a computer model is generated or updated based on the provided tensor set. In an example, based on the structure of the tensor sets provided to the machine learning algorithm, a computer running the machine learning algorithm is able to process time series data for recognizing various patterns in the time series data, which was unable to be performed conventionally, for generating or updating the computer model. Further, the operation S308 may be repeated as more data is acquired for updating of the computer model.

In operation S309 the generated or updated computer model is applied to a main frame computer for predicting future failures.

Figure 4:
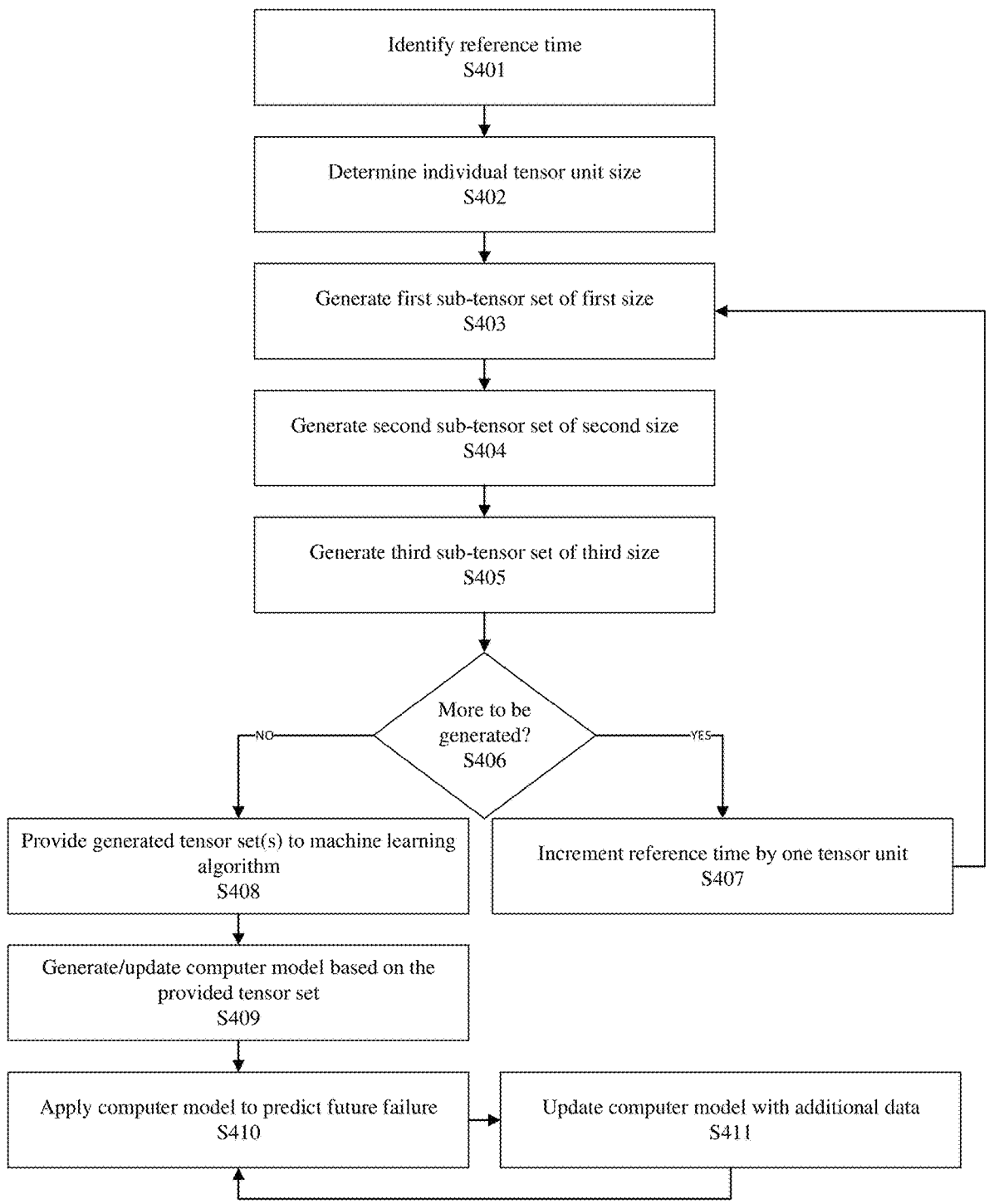
FIG. 4 shows an exemplary method for generating dynamic sized data structures for generating or updating of a computer model by a machine learning algorithm, according to an aspect of the present disclosure.

FIG. 4 shows an exemplary method for generating dynamic sized data structures for generating or updating of a computer model by a machine learning algorithm, according to an aspect of the present disclosure.

In operation S401, a reference time for building a tensor set is identified. The reference time may be an arbitrary point in time, or may be within a certain time range of a known failure time. For example, the reference time may be a start time of a tensor set, such that if the tensor set is to include 4 hours of data, the start time may be set to LOAM which may extend 4 hours deep to end at 1 PM. Alternatively, the reference time may refer to an end time of a tensor set, such that if the tensor set is to include 4 hours of data, the end time may be set to 1 PM, and may include tensor units starting 4 hours prior to the 1 PM. Further still, aspects of the present application are not limited thereto, such that the reference time may refer to a start time of one of a tensor unit included in the tensor set. For example, as exemplarily illustrated in FIG. 6A, the start time may start at 1 PM, which is a start time of the last tensor unit included in the tensor set.

In operation S402, individual tensor unit size is determined. For example, each tensor unit may be set to include one hour of data. However, aspects of the present disclosure are not limited thereto, such that each tensor unit may include different duration of data.

In operation S403, a first sub-tensor set of a first size is generated. In an example, as illustrated in FIG. 6A, one tensor set may include multiple sub-tensor sets having the same reference time, but with varying durations. For example, one sub-tensor set may be two hours in duration, three hours in duration, four hours in duration, and large as twenty-four hours in duration with respect to the 1 PM reference time. Although three sub-tensor set sizes are illustrated in FIG. 6A, aspects of the present disclosure are not limited thereto, such that sub-tensor set sizes may be varied.

In operation S404, a second sub-tensor set of a second size is generated. In an example, the second sub-tensor set of the second size may have one or more tensor units more than the first sub-tensor set.

In operation S405, a third sub-tensor set of a third size is generated. In an example, the third sub-tensor set of the third size may have one or more tensor units more than the second sub-tensor set. Further, the first, second and third sub-tensor sets are generated with respect to the same reference time. Although three sub-tensor sets are illustrated as being generated, aspects of the present disclosure are not limited thereto, such that less or more sub-tensor sets may be generated with respect to the same reference time.

In operation S406, a determination of whether more tensor sets need to be generated is performed. In an example, each tensor set may include one or more sub-tensor sets. Further, the determination of operation S406 may be based on a number of tensor sets generated and comparing that number against a set reference value. For example, at least since the tensor sets are structured to teach machine learning algorithm to recognize a time series data, the number of tensor sets to be generated may be larger than one.

If additional tensor sets are determined to be required in operation S406, the reference time identified in operation S401 is incremented by one tensor unit and another tensor set including one or more sub-tensor sets is generated in operations S403-S405. More specifically, if the reference time identified in operation S401 was 1 PM, then the incremented reference time in operation S407 may be 2 PM. Although incrementation of one tensor unit is disclosed in operation S407, aspects of the present disclosure are not limited thereto, such that the reference time may be incremented by a different duration or different number of tensor units.

If it is determined that no additional tensor sets are required in operation S406, the generated tensor sets are then provided to the machine learning algorithm in operation S408.

In operation S409, a computer model is generated or updated based on the provided tensor sets. In an example, based on the structure of the tensor sets provided to the machine learning algorithm, a computer running the machine learning algorithm may be able to process time series data for recognizing various patterns in the time series data, which was unable to be performed conventionally, for generating or updating the computer model. Further, the operation S409 may be repeated as more data is acquired for updating of the computer model.

In operation S410, the generated or updated computer model is applied to a main frame computer for predicting future failures in the mainframe computer system based on the production time series data.

In an example, machine learning may be conducted using TensorFlow, which is an open-source software library for dataflow programming across a range of tasks. TensorFlow may be a symbolic math library, and used for machine learning applications, such as Neural Networks. In addition, Neural Network may refer to an artificial neural network of discrete interconnected group of nodes. Although a pattern of discrete points of data may be detected by machine learning applications using conventional TensorFlow data, conventional machine learning systems using TensorFlow data fails to consider the time nature of the data points.

In the present application, the acquired data is modified or specifically structured to allow for processing of the acquired data in a time series manner in a machine learning environment. Such modification in data structure allows the machine learning computer systems to process the acquired data in a time series manner to identify specific data patterns leading to the detected failure of the mainframe computer system. Accordingly, the machine learning system may be newly trained to recognize such patterns by specifically structuring the input data to be processed in the above described manner, which was unavailable in the conventional technology.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. Accordingly, the disclosure is considered to include any computer-readable medium or other equivalents and successor media, in which data or instructions may be stored.

Although the present specification describes components and functions that may be implemented in particular embodiments with reference to particular standards and protocols, the disclosure is not limited to such standards and protocols.

The illustrations of the embodiments described herein are intended to provide a general understanding of the structure of the various embodiments. The illustrations are not intended to serve as a complete description of all of the elements and features of the disclosure described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

As described above, according to an aspect of the present disclosure, a method for generating a data set structured for recognition of time series data by a machine learning computer is provided. The method includes acquiring, by a processor and from a mainframe computer system, times series data; generating, by the processor, a plurality of tensor units based on the acquired time series data; identifying, by the processor, a target tensor unit among the plurality of tensor units, the target tensor unit including a time of failure of the mainframe computer system; generating, by the processor, a plurality of tensor sets, in which at least one of the plurality of tensor sets includes the target tensor unit; migrating the plurality of tensor sets to the machine learning computer for analysis of the time series data and recognition of a data pattern preceding the time of failure of the mainframe computer system; generating or updating, by the machine learning computer, a computer model based on the plurality of tensor sets analyzed, the computer model configured to recognize the data pattern preceding the time of failure of the mainframe computer system; and applying the computer model, by the machine learning computer, to data in a production environment for identifying a production data pattern corresponding to the recognized data pattern.

According to another aspect of the present disclosure, the method further includes converting the time series data into a tabular data file; and loading the tabular data file into a data frame. The plurality of tensor units is generated based on the data frame According to another aspect of the present disclosure, the time series data includes message queue (MQ) data logs that indicates a queue depth with respect to time.

According to another aspect of the present disclosure, the data frame is a Python Pandas data frame.

According to another aspect of the present disclosure, the method further includes identifying a tensor unit size for each of the plurality of tensor units; and determining a tensor set size for each of the plurality of tensor sets.

According to another aspect of the present disclosure, method further includes determining whether the plurality of tensor sets should be of a fixed size or include a variation of sizes.

According to another aspect of the present disclosure, when the plurality of tensor sets is determined to be of the fixed size, each of the plurality of tensor sets is of a same size.

According to another aspect of the present disclosure, when the plurality of tensor sets is determined to be of the fixed size, each of the plurality of tensor has a different start time.

According to another aspect of the present disclosure, when the plurality of tensor sets is determined to be of the fixed size, at least one tensor set among the plurality of tensor sets does not include the target tensor unit.

According to another aspect of the present disclosure, when the plurality of tensor sets is determined to include the variation of sizes, each tensor set of the plurality of tensor sets include a plurality of sub-tensor sets.

According to another aspect of the present disclosure, each of the plurality of sub-tensor sets included in a tensor set includes different number of tensor units from one another.

According to another aspect of the present disclosure, each of the plurality of sub-tensor sets include a same target tensor unit.

According to another aspect of the present disclosure, at least two of the plurality of sub-tensor sets are different in size by one tensor unit.

According to another aspect of the present disclosure, each of the sub-tensor sets included in a tensor set includes a same reference time.

According to another aspect of the present disclosure, each of the tensor sets include a different start time.

According to another aspect of the present disclosure, a target tensor unit included in a tensor set is incremented by one tensor unit in another tensor set.

According to another aspect of the present disclosure, the method further includes acquiring, by the processor, additional time series data; and updating, by the machine learning computer, the computer model based on the additional time series data.

As described above, according to an aspect of the present disclosure, a system for generating and applying a data set structured for recognition of time series data by a machine learning computer. The system includes an automated teller machine including a tensor generating computer and the machine learning computer. The tensor generating computer is configured to: acquire, from a mainframe computer system, time series data, generate a plurality of tensor units based on the acquired time series data, identify a target tensor unit among the plurality of tensor units, the target tensor unit including a time of failure of the mainframe computer system, generate a plurality of tensor sets, in which at least one of the plurality of tensor sets includes the target tensor unit, and migrate the plurality of tensor sets to the machine learning computer for analysis of the time series data and recognition of a data pattern preceding the time of failure of the mainframe computer. The machine learning computer is configured to: generate or update a computer model based on the plurality of tensor sets, apply the computer model to data in a production environment, and identify a production data pattern corresponding to the recognized data pattern.

As described above, according to an aspect of the present disclosure, a tangible non-transitory computer readable storage medium that stores a computer program for generating a data set structured for recognition of time series data is provided. The computer program, when executed by a processor, causing a system to perform a process including: acquiring, from a mainframe computer system, times series data; generating a plurality of tensor units based on the acquired time series data; identifying a target tensor unit among the plurality of tensor units, the target tensor unit including a time of failure of the mainframe computer system; generating, by the processor, a plurality of tensor sets, in which at least one of the plurality of tensor sets includes the target tensor unit; analyzing the time series data for recognition of a data pattern preceding the time of failure of the mainframe computer system; generating or updating a computer model based on the plurality of tensor sets analyzed, the computer model configured to recognize the data pattern preceding the time of failure of the mainframe computer system; and applying the computer model to data in a production environment for identifying a production data pattern corresponding to the recognized data pattern.

The Abstract of the Disclosure is provided to comply with 37 C.F.R. § 1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The preceding description of the disclosed embodiments is provided to enable any person ordinarily skilled in the art to make or use the present disclosure. As such, the above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A method for generating a data set structured for recognition of time series data by a machine learning computer, the method comprising:
   acquiring, by a processor and from a mainframe computer system, times series data;
   generating, by the processor, a plurality of tensor units based on the acquired time series data;
   identifying, by the processor, a target tensor unit among the plurality of tensor units, the target tensor unit including a time of failure of the mainframe computer system;
   generating, by the processor, a plurality of tensor sets of differing sizes based on the time of failure of the mainframe computer system, wherein at least one of the plurality of tensor sets includes the target tensor unit;
   migrating the plurality of tensor sets of differing sizes to the machine learning computer for analysis of the time series data;
   determining a data pattern preceding the time of failure of the mainframe computer system based on the plurality of tensors sets of differing sizes and the time of failure of the mainframe computer system, the data pattern having a varying length based on the plurality of tensor sets of differing sizes;
   generating or updating, by the machine learning computer, a computer model based on the plurality of tensor sets analyzed, the computer model configured to recognize the data pattern preceding the time of failure of the mainframe computer system; and
   applying the computer model, by the machine learning computer, to data in a production environment for identifying a production data pattern corresponding to the recognized data pattern.

2. The method of claim 1, further comprising: converting the time series data into a tabular data file; and loading the tabular data file into a data frame, wherein the plurality of tensor units is generated based on the data frame.

3. The method of claim 1, wherein the time series data includes message queue (MQ) data logs that indicates a queue depth with respect to time.

4. The method of claim 2, wherein the data frame is a Python Pandas data frame.

5. The method of claim 1, wherein each of the plurality of tensor units include one hour of time series data.

6. The method of claim 1, further comprising:
   identifying a tensor unit size for each of the plurality of tensor units; and determining a tensor set size for each of the plurality of tensor sets.

7. The method of claim 1, wherein each tensor set of the plurality of tensor sets include a plurality of sub-tensor sets.

8. The method of claim 7, wherein each of the plurality of sub-tensor sets included in a tensor set includes different number of tensor units from one another.

9. The method of claim 7, wherein each of the plurality of sub-tensor sets include a same target tensor unit.

10. The method of claim 7, wherein at least two of the plurality of sub-tensor sets are different in size by one tensor unit.

11. The method of claim 7, wherein each of the sub-tensor sets included in a tensor set includes a same reference time.

12. The method of claim 7, wherein each of the tensor sets include a different start time.

13. The method of claim 1, wherein a target tensor unit included in a tensor set is incremented by one tensor unit in another tensor set.

14. The method of claim 1, further comprising: acquiring, by the processor, additional time series data; and updating, by the machine learning computer, the computer model based on the additional time series data.

15. A system for generating and applying a data set structured for recognition of time series data by a machine learning computer, the system comprising:
a memory; and
a processor configured to:
acquire, from a mainframe computer system, time series data;
generate a plurality of tensor units based on the acquired time series data;
identify a target tensor unit among the plurality of tensor units, the target tensor unit including a time of failure of the mainframe computer system;
generate a plurality of tensor sets of differing sizes based on the time of failure of the mainframe computer system, wherein at least one of the plurality of tensor sets includes the target tensor unit;
migrate the plurality of tensor sets to the machine learning computer for analysis of the time series data;
determine a data pattern preceding the time of failure of the mainframe computer system based on the plurality of tensors sets of differing sizes and the time of failure of the mainframe computer system, the data pattern having a varying length based on the plurality of tensor sets of differing sizes;
generate or update, by the machine learning computer, a computer model based on the plurality of tensor sets analyzed, the computer model configured to recognize the data pattern preceding the time of failure of the mainframe computer system; and
apply the computer model, by the machine learning computer, to data in a production environment for identifying a production data pattern corresponding to the recognized data pattern.

16. A tangible non-transitory computer readable storage medium that stores a computer program for generating a data set structured for recognition of time series data, the computer program, when executed by a processor, causing a system to perform a process comprising:
acquiring, from a mainframe computer system, times series data;
generating a plurality of tensor units based on the acquired time series data;
identifying a target tensor unit among the plurality of tensor units, the target tensor unit including a time of failure of the mainframe computer system;
generating, by the processor, a plurality of tensor sets of differing sizes based on the time of failure of the mainframe computer system, wherein at least one of the plurality of tensor sets includes the target tensor unit;
migrating the plurality of tensor sets of differing sizes to a machine learning computer for analysis of the time series data;
analyzing the time series data for recognition of a data pattern preceding the time of failure of the mainframe computer system based on the plurality of tensors sets of differing sizes and the time of failure of the mainframe computer system, the data pattern having a varying length based on the plurality of tensor sets of differing sizes;
generating or updating, by the machine learning computer, a computer model based on the plurality of tensor sets analyzed, the computer model configured to recognize the data pattern preceding the time of failure of the mainframe computer system; and
applying the computer model, by the machine learning computer, to data in a production environment for identifying a production data pattern corresponding to the recognized data pattern.

* * * * *